Patented Dec. 30, 1952

2,623,828

UNITED STATES PATENT OFFICE 2,623,828

CEMENTITIOUS MATERIAL AND METHOD OF MAKING

Leonard P. Dove, Boulder, Colo., assignor to Porolith, Inc., Boulder, Colo., a corporation of Colorado No Drawing. Application March 25, 1949, Serial No. 83,527

6 Claims. (Cl. 106—99)

This invention relates to cementitious compositions, and to a method of making such compositions. The invention is directed more particularly to a method of treating an ingredient of a cementitious composition, such as vegetable fibers, so that such ingredient can be combined in hydrosetting cements with the minimum of interference with the setting or hardening of the cement by the harmful solubles contained in the ingredient.

This application is a continuation as to common subject matter of my application Serial No. 770,767, filed August 26, 1947, now abandoned.

It has long been known that a plastic mass formed from vegetable fibers, such as sawdust, shavings, fibered grain straw, flax shives and others, and bound together by a hydrosetting cement has distinctive merits as a building material. For example, a building material containing such vegetable fibers is very light in weight, has a high strength, low heat conductivity and great durability. Such a material approaches wood or lumber in many properties, but has the advantage of being fire and termite resistant. Furthermore, it will not rot, nor will it have the moisture expansion and shrinkage disadvantages present in wood. When properly made, such a material will have a very low cost of manufacture.

The vegetable fibers usable in such a cementitious composition must be treated, however, because all of these fibers have a certain percentage of their chemical components which are soluble in water as well as alkaline solutions. For instance, wheat straw may yield up to 5% of its weight which is soluble in water alone, but in solutions of alkalis such as sodium carbonate, caustic soda or calcium hydrate, the percentage rises to about 15% to 18%. These solubles belong, for the most part, to sugars and xyloses which, if added to cement, inhibit or totally destroy the setting properties thereof. These solubles are therefore very harmful from the standpoint of making a strongly bonded composition of vegetable fibers and cement, and, when water alone is used in such a composition, it is virtually impossible for the cement to set or harden. The amounts of these harmful solubles will, of course, vary to a great extent depending upon the particular vegetable fiber used. Some fibers will yield relatively small percentages of harmful solubles, but many of the most useful and abundant fibers will yield a relatively high percentage of such harmful solubles.

It is, therefore, an important object of the present invention to provide a process of treating a material for admixture with cement to form a concrete or cementitious composition, which will form a coating on the material and prevent any harmful solubles which may be present in such material from inhibiting or preventing the cement from setting or hardening.

Another object of the invention is to provide a method of treating a material for admixture with cement to form a cementitious composition, which treatment will form a coating of a hydrous silicate gel or a metallic silicate on the material, and thus prevent any harmful solubles which may be present in the material from inhibiting or preventing the cement from setting or hardening.

A further object of the invention is to provide a method of treating fibrous material which consists in wetting the material with an acid reacting substance, which may consist of either an acid or a metallic salt, and then adding to the wetted material a soluble silicate, such as sodium silicate. The silicate will thereupon react with the acid reacting substance and precipitate a hydrous silicate gel. This gel forms a coating in and on the fibrous material and thus prevents any harmful solubles which may be present therein from reaching the cement or having any deleterious effect on the setting or hardening properties of the cement to which it may be added.

Still another object of the invention is to provide a cementitious material as a composition of matter which consists of a cement and a fibrous material coated with a silicate precipitate, the precipitate being formed on the material by the addition of an acid reacting substance and a soluble silicate.

Other objects and advantages of the invention will become apparent upon reading the following description.

As will be pointed out hereinafter, the invention herein consisting of the method of treatment, may be applied equally as well to other concrete ingredients such as unwashed sand. While such a material is not fibrous, nevertheless the dirt and other particles normally clinging to the unwashed sand will have their harmful effect upon the setting or hardening properties of the cement. The effect may be to prevent the cement from setting or at least inhibit the setting to a great extent.

There have been many attempts in the past to discover an economical method for the treatment of vegetable fibers so that they may be successfully used as an ingredient of a cementitious composition. For example, it has been proposed to leach out the harmful solubles by treating the straw or other fiber with dilute alkalis, such as sodium carbonate solutions of a strength of from 2% to 5% of alkali, over a long period of time with or without heating or pressure, and then wash out the residues of harmful solubles with water. It has been found that such a process requires extensive equipment due to the bulk of the fibers, and the cost of the chemicals and the operation would be excessive. Furthermore, wheat or barley straw treated with a 5% sodium carbonate solution for 24 hours and then washed and incorporated into a concrete with four times as much cement by weight as the original dry straw does not set to a hard and durable composition.

Another proposal which has been made and designed to render inert to cement the harmful solubles of vegetable fibers was to film the fibers with asphalt or tar, or some other insoluble matter, so as to block off and prevent the harmful solubles from reaching the cement. Such a method has been found to be expensive and usually the bond between the fiber and cement is poor.

A still further attempt in the past was to treat the fibers with a metallic salt, such as ferric chloride, calcium chloride, magnesium chloride or the like, and then neutralize the salt with an alkali, such as sodium carbonate or calcium hydrate. The resulting reaction purported to precipitate a hydrate of the metals on and in the fibers and thus mineralize the fibers against the action of the cement.

These and other proposals and suggestions in the past are either too expensive or ineffective, since the harmful solubles are allowed to diffuse into the cement before the additives can be effective.

The essence of the present invention is the formation of a film in and on the fibers which will not allow the harmful solubles to pass from the fibers to the cement. That is to say, diffusion of these solubles into the cement is prevented altogether, whereupon these solubles become harmless to cause any loss of strength of the cement.

In general, the method consists in wetting a fibrous material, or other ingredient, such as unwashed sand, with an acid reacting solution and then adding to the wetted material a soluble silicate. The reaction between these two substances produces an insoluble silicate coating in and on the fibers before it is added to the cement. This silicate coating thus prevents any diffusion of the harmful solubles from the fibers into the cement.

Several acid reacting materials have been found to be successful in carrying out the present invention. If an acid is used, it may be preferable to use either sulfuric or hydrochloric acid. If a metallic salt is used, a preferred solution is one containing a salt of such trivalent metals as iron, aluminum or chromium. As a secondary choice, a solution of a salt of the bivalent metals, such as copper, zinc, calcium or magnesium, may be used. In any case, whether an acid or a metallic salt is used, a sufficient amount of a soluble silicate, such as sodium silicate, is added to bring the insoluble component or precipitate about to the neutral point. The treated fiber may then be added to the cement and molded.

It will be understood that the same result may be obtained if the steps of adding the reagents are reversed, wetting the fibers first with the soluble silicate and then adding the acid or metallic salt. In either case, a hydrous silicate gel is precipitated on and in the fibers which seals the fibers and prevents any diffusion of the harmful solubles contained therein.

The preferred form of carrying out the method of the present invention is to wet a fibrous material such as wheat or barley straw, with a dilute solution of sulfuric acid and then add a solution of sodium silicate. The acid and silicate will react to form a hydrous silicate gel in and on the fibers, which may then be added to a cement and molded.

One of the important features of the invention resides in the finding that the silicate film must become and remain hydrous until the hydrosetting material has been applied to the fibrous material in order to give effective results. It has been observed that drying out of the silicate film after precipitation on the fiber renders the film ineffective in preventing the diffusion of the harmful solubles from the fiber into the hydrosetting material. Rewetting of the dried film and fibers fails to restore the effectiveness of the film. Hence, it will be understood that the fibrous material and the silicate film deposited thereon must be retained in the hydrous state from the deposition of the film until the coating with hydrosetting material has been achieved.

The following typical examples have been carried out and have been found to result in a readily moldable plastic mass which could be hardened into a strong and durable concrete:

*Example I*

One hundred (100) grams of barley straw was ground to a fiber on a swing hammer mill, which resulted in a fiber of a maximum length of about ½ inch. This fiber was then wetted with about 300 cc. of water to which had been added 10 grams of sulfuric acid of 66 degree Baumé and allowed to stand for about 30 minutes, then 80 grams of sodium silicate of about 38 degree Baumé was thoroughly incorporated with the acid wetted fiber. Gelling of the silicate from the action of the acid started almost at once so that the fiber became coated with a silicic acid gel. After about 10 minutes, the fiber and gel were added to about 400 grams of Portland cement. This resulted in a plastic mass resembling a fat clay that could be readily molded with the hands. When fully cured in a moist chamber, then dried, the concrete was hard and glassy, very much as though sand had been used instead of fiber. On testing tensile and compressive strength, it was found that both of these strengths were well above the usual accepted building standards.

The amount of acid cited in the above example may be reduced to as low as 1 or 2 grams per hundred grams of dry fiber and to 6 to 15 grams of liquid silicate or water glass and yet provide adequate hydrous silicate gel to protect diffusion of the harmful solubles into the cement.

As compared to the above experiment, compositions made by using the same proportions of dry fiber treated by alkali leaching or with metallic salt and alkali, then afterward combined with four times the dry weight of Portland cement and with equivalent amounts of water, when cured and dried, showed no strength, either tensile or compressive.

*Example II*

Twelve (12) pounds of dry quaking aspen wood fiber was prepared by shredding the wood and passing it through a swing hammer mill with ⅛ inch screen openings. The fiber was thoroughly wetted with 30 pounds of water in which was dissolved 4 ounces of aluminum sulfate. Then a solution of sodium silicate prepared by diluting one pound of water glass with 5 pounds of water was slowly added to the wetted fiber in a mixer. Finally, 24 pounds of Portland cement were added to the coated fiber and mixing was continued until a uniform mass was achieved. After molding, curing and drying the composition had a tensile strength of 250 pounds per square inch and a density of 40 pounds per cubic foot.

*Example III*

Fifteen (15) pounds of dry coarse cottonwood sawdust was further ground on a swing hammer mill through 1/8 inch round openings. The ground sawdust was wetted with a solution of 5 ounces of ferrous sulfate in 22 pounds of water followed by addition of 1¼ pounds of sodium silicate in 5 pounds of water. Finally, 30 pounds of Portland cement was uniformly mixed therewith, and the mass was molded, cured and dried. This composition had a tensile strength of 210 pounds per square inch.

*Example IV*

Five (5) pounds of dry palmetto palm fiber ground to 3/8 inch size was blended with 15 pounds of Florida pine sawdust. 30 pounds of water containing 9 ounces of aluminum sulfate was added followed by 2 pounds of sodium silicate in 8 pounds of water. Then 40 pounds of Portland cement was added and the mass was thoroughly mixed. After molding, curing and drying, the composition showed a tensile strength of 200 pounds per square inch.

Since a commonly accepted standard of tensile strength for fiber board is a minimum of 150 pounds per square inch, it will be seen that the compositions fabricated as above are equal or superior in strength to fiber board while being comparable to fiber board on a weight basis.

Other experiments have been carried out repeating the general procedure indicated above wherein other types of fibers have been used, such as wood fibers, grain straws, and flax fibers. In each of these experiments the material was first wetted with an acid reacting material and then with a soluble silicate for the purpose of precipitating either a hydrous silicate gel or a metallic silicate in and on the fiber. The tensile and compressive strengths of the resulting compounds with cement in all of these cases were invariably higher than when made in accordance with any previously known methods.

It will be seen from the above examples that the weight ratio of hydrosetting material to fibrous material may vary over a wide range depending upon the particular type of finished product which is sought. For example a low ratio of fibrous material to cement may be added where exceptional structural strength is desired, but light weight is also of importance. At the other extreme, a high ratio of fibrous material to cementitious material may be employed where a light weight structural material is sought which will also have substantial structural strength. In the examples weight ratios of hydrosetting material to fibrous material ranging from 4:1 to 2:1 are shown, but the invention is not intended to be so limited. A very satisfactory and strong fibered concrete having a weight as low as 35 pounds per cubic foot, or roughly, the weight of many woods, can be made with the ratio of cement to dry fiber of 1:1 by weight.

It will also be recognized that the weight ratio of fibrous material to sodium silicate may be varied over wide limits without departing from the spirit of the invention. Obviously the amount of insoluble silicate must be sufficient to result in an impervious film about all of the fibrous material used. This amount may be considered the minimum amount which can be used in the practice of the invention. Over-treatment or formation of more hydrous silicate than is necessary for complete coverage of the fibrous material has not been found to have any undesirable effect on the finished product, but over-treatment is to be avoided for economic reasons. The foregoing examples show the use of weight ratios of sodium silicate to fibrous material ranging from 1:1.25 to 1:12, but the invention is not intended to be so limited.

The amount of acid reacting substance may also be varied as desired, but it will be recognized that the preferred amount should be sufficient to react with substantially all of the sodium silicate in the formation of the impervious gel. Use of a smaller amount will result in improper formation of the gel while use of an excessive amount is economically unfeasible. The examples disclose the use of weight ratios of acid substance to sodium silicate ranging from 1:4 to 1:8.

From the foregoing disclosure it will be apparent that the most satisfactory practice of the present invention will result from adaptation of the principles to a particular situation deemed most desirable by the practitioner. Anyone reasonably familiar with the building trades can readily adapt the invention to his own desires by conducting routine experiments on the materials he may have at hand. When an untried fiber is to be used the amount of sodium silicate and other ingredients to be employed for optimum results may be determined by the following simple and routine test:

Based on the dry weight of the fiber, three samples are prepared comprising 6% to 8%, 10% to 15% and 15% to 24% of sodium silicate and 2%, 4% and 6% of ferrous sulfate respectively, together with the same amount of cement in each case, for example, two parts of cement to one part of dry fiber by weight. After curing and drying the samples, an examination of the samples will indicate which one best accomplishes the desired result of completely coating the fiber with an impervious film.

Some fibers give better results with aluminum sulfate, others with ferrous sulfate. Some fibers react with the acid reacting salt in such a way as to require less silicate to neutralize. Soluble silicates vary in alkali content, hence, exact amounts of silicate cannot be specified for every case. The preferred amount of acid reacting material and silicates may be easily determined by simple and well known experiments.

The above test may be duplicated using aluminum sulfate in place of ferrous sulfate in which case the strength and quality of the product may be judged as to kind and amount of acid reacting material to use.

In addition to the advantages mentioned above, the hydrous silicates impart to the mix superior working qualities, such as good plasticity, if it is desirable to mold the product as a stiff mud. The mass may be kept dry and molded with slight pressure on conventional cement block machines, and removed from the mold in the same manner as when the dry mix of sand-cement concrete is used.

Any consistency of mortar may be produced by adding more water, even up to a semi-liquid. It is possible to form excessive amounts of the hydrous silicate gel over that which is necessary for actually sealing off the harmful solubles. Such an excessive amount of hydrous silicate gel will shrink upon drying and thereupon will yield voids. These voids will decrease the weight of the material and thus a very light weight composition may be made as low as 20 or 25 pounds per cubic foot.

This process and composition whereby voids are introduced into a cementitious material is fully described in my copending application, Serial No. 705,026, filed October 23, 1946, now abandoned.

The final weight or density per cubic foot of the material or composition formed in accordance with this invention is not dependent upon the formation of a gas or the use of a fragile, light aggregate such as expanded minerals that are easily crushed or compressed upon working the concrete. But to the contrary, the weight or density is dependent upon an incompressible gel, therefore, the compositions made in accordance with this method may be tamped, pressed or even extruded under pressure, much like clay products, without damage or change in the final density of the product.

As stated hereinbefore, the process is not necessarily limited to the treatment of fibrous materials, but may also be used to treat other materials such as unwashed sand. The humus compounds often found in sand and gravel are closely allied to the harmful solubles that interfere with or prohibit the set of cements.

It is customary to test sand or gravel by adding a measured amount of alkali solution, such as caustic soda, to a measured amount of the sand to be tested. Generally, a brownish color of the solution indicates excessive amounts of humus compounds and thereupon the sand or gravel is refused as too dirty to qualify for making good concrete.

In applying the method of the present invention to sand having an excessive amount of humus compounds therein, such sand was treated with a solution of ferric sulfate or ferrous sulfate in the ratio of 1 part of ferrous sulfate to 100 parts by weight of dirty sand. Then about 4 parts by weight of sodium silicate was added after which the resulting material was mixed with cement and made into a concrete. Sand treated in the above manner showed tensile and compressive strengths from 15% to 25% higher than when the concrete was made with untreated sand and using the same proportions of cement to sand.

Thus it will be evident that silicate filming, in accordance with the present invention, may also be utilized to increase the strength of concrete made from sand contaminated with organic matter. In many cases this method may make a satisfactory concrete from dirty sand that would otherwise be refused without the treatment. It is recognized that washed sand is usually specified for concrete, however, it may not always be possible to obtain washed sand, in which case the silicate filming method may then be used to build up the strength of the concrete to that attained by using washed sand.

The silicates used in the present process are all compatible with materials which may be used as fillers and including sand, crushed rock, asbestos or inorganic fibers, and there will be no reaction with them to injure the composition.

It has also been determined that the hydrous silicate gel which is formed on the fibers in accordance with the present invention appears to accelerate the setting period of Portland cement, and thus has the additional advantage of a quick setting concrete if such is desired.

The proportions of the acid reacting chemicals, soluble silicate and cement as set forth hereinabove, are not intended to be limiting in any way, inasmuch as experimentation with any given fiber will indicate the preferred type and amount of chemicals to be used. Experimentation has indicated that a small excess of either the acid or silicate is not harmful to the composition. Sulfates in general may be preferred to chlorides since the excess calcium present in most cements may form calcium sulfate which is less soluble than the chlorides. It appears to be immaterial, with respect to the effectiveness of the hydrous gel in preventing the harmful solubles from spoiling the cement strength, whether the acid used is a chloride, sulfate or nitrate. Each of these appears to be effective to attain the desired result.

By the term cement as used herein is meant the universally accepted hydrosetting material for use in structural work. The best known and most commonly accepted cement employed in the construction industry is the Portland type, and the present invention relates principally to this type of hydrosetting cement. It has also been found, however, that such cements as the magnesia-magnesium chloride type, and the calcined gypsum type give stronger compositions when mixed with silicate filmed fiber than when mixed with untreated fiber.

The acid reacting aluminum sulfate referred to is the ordinary commercial "paper makers alum" containing about 17% of $Al_2O_3$. Ferrous sulfate is commercial copperas. Ordinary, cheap and abundant commercial reagents are quite satisfactory. The soluble silicate commonly used is commercial water glass of a Baumé of 38 degrees to 40 degrees. Silicates of low alkalinity are preferred since they require less acid reacting material to neutralize.

While the method described hereinabove is perhaps the preferred form of carrying out the invention, it is within the spirit of the invention to modify this procedure by first treating the vegetable fibers with an acid reacting substance, such as an iron or aluminum salt, then drying the treated fiber and incorporating it with the dry cement in proper proportion. In this event the mixture of cement and treated fiber may be transported as such directly to the job where the correct amount of a soluble silicate may be added to the mixing water used to make a workable composition. The hydrous silicate film will thereupon be formed by reaction between the salt and the soluble silicate. This modified form of procedure may be preferable where the product of the mixed cement and dried treated fiber is made at or near the cement plant, then bagged and shipped as a proprietary product, requiring only the silicate in the operation of mixing for use.

A further commercial variation may be followed whereby the fiber is first treated with a solution of the acid reacting substance such as an iron or aluminum salt, dried and then before mixing with the cement is wetted with a solution containing the soluble silicate in the proper amount so as to precipitate the insoluble silicate gel on and in the fibers.

The invention is hereby claimed as follows:

1. The process of making a light weight durable concrete which comprises coating a fibrous vegetable material containing organic water soluble components with an impervious hydrous silica gel and while said gel of said coated material is in its hydrous state mixing a hydrosetting cement therewith.

2. The process of making a light weight durable concrete which comprises coating a fibrous vegetable material containing organic water soluble components with an impervious hydrous silica gel and while said gel of said coated material is in its hydrous state mixing Portland cement therewith.

3. The process of making a light weight durable concrete which comprises wetting vegetable fibers containing organic water soluble components with an aqueous solution of aluminum sulfate, mixing with said wetted material an aqueous solution of sodium silicate sufficient to react with said aluminum sulfate to form in situ on said fibers an impervious hydrous silica alumina gel, and while said gel is in its hydrous state mixing a hydrosetting cement with said hydrous gel containing fibers.

4. The process of making a light weight durable concrete which comprises wetting vegetable fibers containing organic water soluble components with an aqueous solution of ferrous sulfate, mixing with said wetted material an aqueous solution of sodium silicate sufficient to react with said ferrous sulfate to form in situ on said fibers an impervious hydrous silica gel, and while said gel is in its hydrous state mixing a hydrosetting cement with said hydrous gel containing fibers.

5. The process of making a light weight durable concrete which comprises wetting vegetable fibers containing organic water soluble components with an aqueous solution of sulfuric acid, mixing with said wetted material an aqueous solution of sodium silicate sufficient to react with said sulfuric acid to form in situ on said fibers an impervious hydrous silica gel, and while said gel is in its hydrous state mixing a hydrosetting cement with said hydrous gel containing fibers.

6. The product resulting from the process of claim 1.

LEONARD P. DOVE.

REFERENCES CITED

The following references are of record in the file of this patent:

UNITED STATES PATENTS

| Number | Name | Date |
|---|---|---|
| 426,202 | Munsie | Apr. 22, 1890 |
| 1,309,296 | Marke | July 8, 1919 |
| 1,463,123 | McAllister | July 24, 1923 |
| 2,377,484 | Elmendorf | June 5, 1945 |

FOREIGN PATENTS

| Number | Country | Date |
|---|---|---|
| 18,622 | Great Britain | 1896 |
| 130,312 | Great Britain | 1919 |
| 444,692 | Great Britain | 1936 |